E. R. BRINKER.
TROUSERS STRETCHER.
APPLICATION FILED APR. 23, 1910.
992,402.
Patented May 16, 1911.
2 SHEETS—SHEET 1.
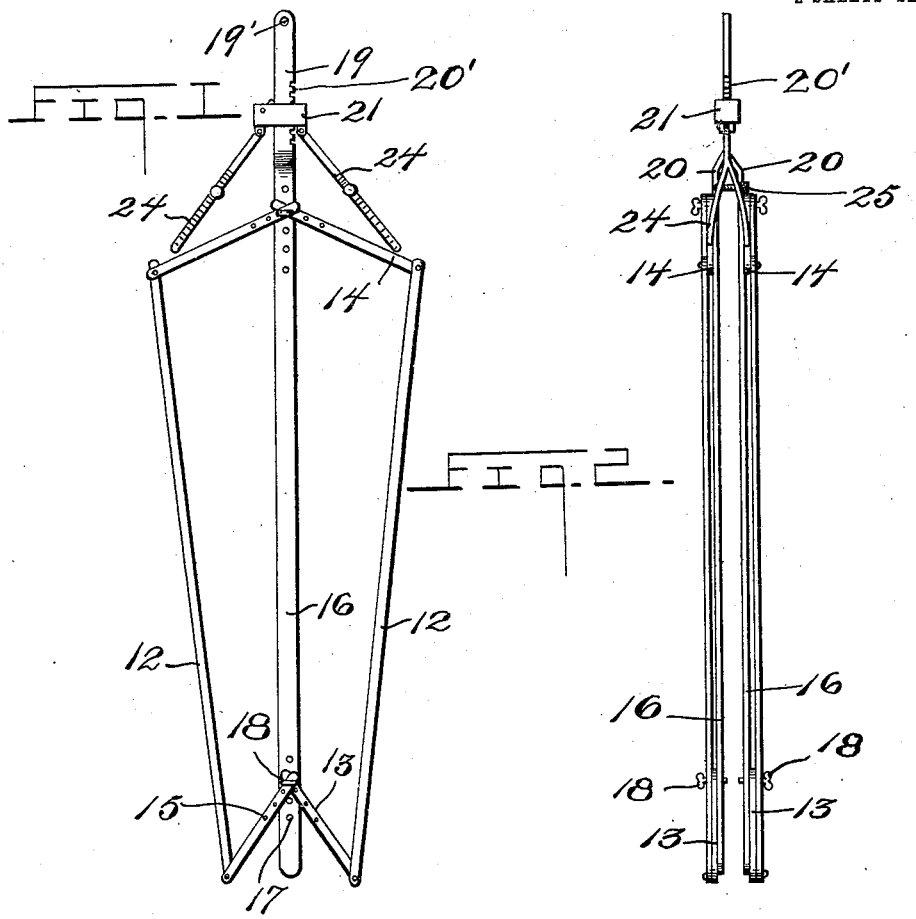
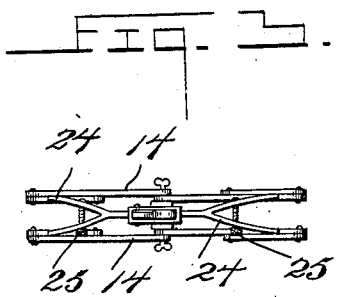
Witnesses
E. E. Johansen
M. D. Lions
Inventor
Earl R. Brinker.
By Woodward & Chandlee.
Attorneys

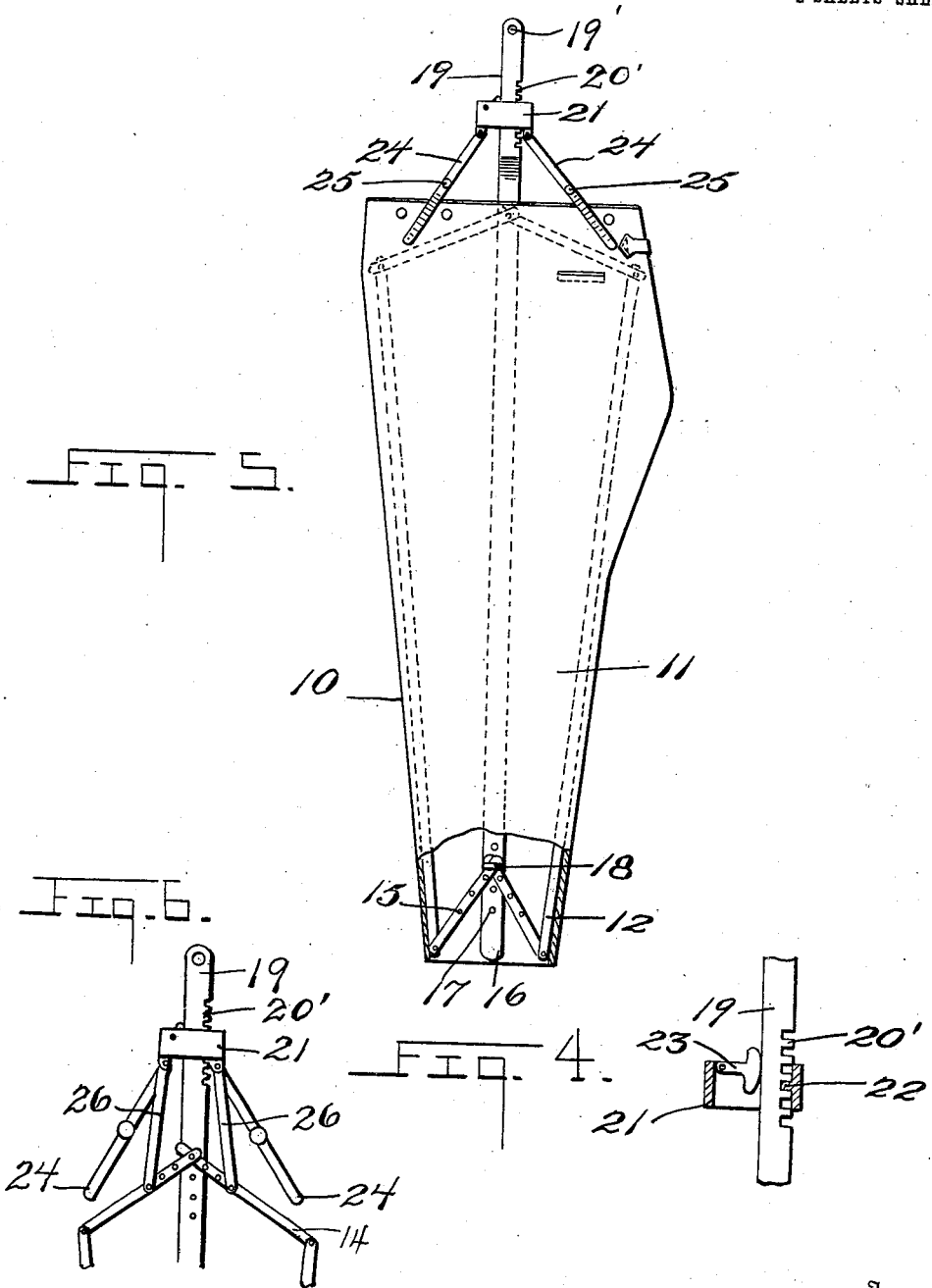

UNITED STATES PATENT OFFICE.

EARL R. BRINKER, OF SPENCER, OHIO.

TROUSERS-STRETCHER.

992,402.

Specification of Letters Patent. Patented May 16, 1911.

Application filed April 23, 1910. Serial No. 557,231.

*To all whom it may concern:*

Be it known that I, EARL R. BRINKER, a citizen of the United States, residing at Spencer, in the county of Medina and State of Ohio, have invented certain new and useful Improvements in Trousers-Stretchers, of which the following is a specification.

This invention relates to trousers stretchers, and has for its object to provide such a device which is adapted to stretch both legs of a pair of trousers at once, by means of an expansible frame inserted in each leg of the trousers.

A further object is to provide a novel means for operating both frames simultaneously.

Another object is to provide a novel form of means for holding the device in engaged position.

A further object is to provide a novel form of suspending means for the trousers coöperating with the remainder of the device in such a way as to facilitate the operation of expanding the frame.

Other objects and advantages will be apparent from the following description, and it will be understood that changes in the specific structure shown and described may be made within the scope of the claims without departing from the spirit of the invention.

In the drawings, Figure 1 is a side view of the device, Fig. 2 is an edge view thereof, Fig. 3 is a top view, Fig. 4 is a cross sectional view of the locking means, Fig. 5 is a side view of the device in coengagement with a pair of trousers, showing a portion of the mechanism in dotted outline. Fig. 6 is a fragmentary view, in side elevation of the upper portion of the stretcher.

Referring to the drawings, there is shown a pair of trousers 10 having opposite legs 11 in each of which there is inserted an expansible collapsible frame, including the vertical creasing members 12 and having pivoted at their opposite ends link members 13 and 14 respectively, the first named being shorter than the latter, the outer ends of the links being inserted between the divergent side members 12 and pivoted in a suitable manner, their inner end portions being provided with a plurality of longitudinally spaced transverse perforations 15, the links being inclined upwardly with respect to the trousers, and intersecting each other, at their points of intersection being pivotally connected to a vertically extending operating rod 16 having longitudinally spaced openings 17, by means of suitable pins 18 projected through the perforations in the links and rods, as shown. The rods 16 of each frame are carried upon a common stem 19, from which they diverge as shown at 20, the stem having a series of rack teeth or other suitable irregularities formed in one edge, and carrying a locking collar 21 slidably thereon, the collar having an oblong slot vertically therethrough receiving the stem 19, and being provided at one end of the slot with a suitable tooth 22 arranged to project into the toothed portion 20' of the stem to hold it against relative longitudinal movement through the collar. The stem is movable into the opposite end of the slot, however, to disengage the tooth from the notched portion 20', but carried upon the upper edge of the collar there is a pivoted dog 23 arranged to swing inwardly over the slot and bear against the rear side of the stem, to hold it against movement out of engagement with the tooth 22. The dog is controlled by gravity which tends to normally hold it in such engagement with the stem to retain the stem in locked position.

Carried pivotally by the collar 21, there are oppositely extending pairs of resilient divergent clamping arms 24, adapted to clamp therebetween the upper portions of trousers for suspension thereof, and being provided intermediately of their lengths with clamping screws 25 for drawing the arms together and bringing them into coengagement with opposite sides of fabric engaged therebetween.

The upper portion of the stem 19 serves as a suitable operating handle and has a transverse opening 19' therethrough by which the device may be suspended from a nail or other projection.

In use, the spaced frames are inserted in respective legs of trousers to be stretched and the clamping arms 24 coengaged with the upper portions thereof to hold them at a proper height with respect to the frame. After this operation the dog 23 is raised and the stem 19 forced downwardly, distending the frames through the agency of the rods 16, and when sufficient tension is produced the notched side of the stem is brought into engagement with the tooth 22 and the dog 23 allowed to fall against the rear side of the stem to hold it in locked position. If it should be found that one side of the trousers is stretched more than the other, the device may be loosened by raising the stem 19 and the side of the trousers which is found too loose adjusted higher between the clamping arms 24, after which the second operation of the stem 19 will bring the frames into more equal action upon the opposite side of the trousers.

In Fig. 6 there is shown means for more effectively insuring the forceful spreading of the frames, which consists in connecting links 26 with the links 14, intermediately of the length of the latter, the links 26 being connected to the collar 21 inwardly of the spring arms 24 in such a way as to prevent interference to the operation of the latter, and by this means when the stem 19 is forced downwardly, the spreading of the frames is positively induced. The operation of the modified form of the device is accomplished in the same manner as that previously described.

It will be seen from the foregoing that an extremely simple, effective and cheaply constructed trousers stretcher is provided which will save a considerable amount of time in adjustment of trousers thereon owing to the arrangement for stretching both the legs of the trousers simultaneously, and which is further efficient in providing means for continuing the creasing of trousers above the leg portions, the clamp members being adapted to extend downward adjacent to the rods 12, whereby the crease may be continued up the front of the trousers and up the back as is customary in pressing such garments with an iron.

What is claimed is:

1. In a trousers stretcher, the combination with an expansible frame including vertical crease forming members and pivoted inwardly extending links connected to the opposite ends of each, a vertical operating member pivotally connected to the inner ends of the links, and having a rack near its upper end, a collar member slidable upon the upper portion of the operating member, having a tooth for engagement with said rack, resilient adjustable clamping members pivoted to the collar and adapted to hold the upper portions of the trousers, links pivotally connected to the collar and to the upper of said links, and means on the collar to engage the operating member to hold the same in adjusted position.

2. In a trousers stretcher, the combination with an expansible frame including vertical crease forming members and pivoted inwardly extending links connected to the opposite ends of each, a vertical operating member pivotally connected to the inner ends of the links and having a rack near its upper end, a collar member sliding upon the upper portion of the operating member having a tooth adapted for engagement with said rack, resilient adjustable clamping members pivoted to the collar and adapted to hold the upper portions of the trousers, links pivotally connected to the collar and to the upper of said links and a pivoted gravity controlled friction member on the collar adapted for engagement with the operating member to hold the same in adjusted positions, and to hold the tooth on said collar in engagement with said rack.

In testimony whereof I affix my signature, in presence of two witnesses.

EARL R. BRINKER.

Witnesses:
T. W. SHAW,
GEORGE W. TINGLE.

---

Copies of this patent may be obtained for five cents each, by addressing the "Commissioner of Patents, Washington, D. C."